United States Patent
Huang et al.

(10) Patent No.: US 8,520,175 B2
(45) Date of Patent: Aug. 27, 2013

(54) PATTERNED RETARDER FILM AND METHOD FOR MANUFACTURING THE SAME

(75) Inventors: Kuan-Hao Huang, Longtan Township, Taoyuan County (TW); Fung-Hsu Wu, Gueishan Township, Taoyuan County (TW)

(73) Assignee: Benq Materials Corp., Taoyuan County (TW)

( * ) Notice: Subject to any disclaimer, the term of this patent is extended or adjusted under 35 U.S.C. 154(b) by 375 days.

(21) Appl. No.: 12/973,087

(22) Filed: Dec. 20, 2010

(65) Prior Publication Data
US 2011/0292330 A1    Dec. 1, 2011

Related U.S. Application Data

(60) Provisional application No. 61/348,768, filed on May 27, 2010, provisional application No. 61/367,033, filed on Jul. 23, 2010.

(51) Int. Cl.
*G02F 1/1335* (2006.01)

(52) U.S. Cl.
USPC .............. 349/117; 349/118; 349/119

(58) Field of Classification Search
None
See application file for complete search history.

(56) References Cited

U.S. PATENT DOCUMENTS

| | | |
|---|---|---|
| 2,631,496 A | 3/1953 | Rehorn |
| 2,647,440 A | 8/1953 | Rehorn |
| 5,692,226 A | 11/1997 | Hall |
| 6,002,518 A | 12/1999 | Faris |
| 6,046,787 A | 4/2000 | Nishiguchi |
| 6,192,226 B1 | 2/2001 | Fang |
| 6,195,205 B1 | 2/2001 | Faris |
| 6,498,679 B2 | 12/2002 | Lee et al. |
| 6,624,863 B1 | 9/2003 | Jacobs et al. |
| 6,963,356 B2 | 11/2005 | Satoh |
| 7,050,233 B2 | 5/2006 | Nikolov et al. |
| 7,414,782 B2 | 8/2008 | Jung |
| 7,440,044 B2 | 10/2008 | Peterson et al. |
| 7,580,085 B2 | 8/2009 | Jacobs et al. |
| 7,623,111 B2 | 11/2009 | Ioki et al. |
| 7,969,541 B2 * | 6/2011 | Okuyama et al. ............. 349/117 |
| 2010/0149472 A1 * | 6/2010 | Hoshi .................... 349/119 |

* cited by examiner

*Primary Examiner* — Thanh-Nhan P Nguyen
(74) *Attorney, Agent, or Firm* — McClure, Qualey & Rodack, LLP

(57) ABSTRACT

A patterned retarder film comprises a first substrate, a pattern configuration, an alignment layer formed on the pattern configuration, and a liquid crystal layer disposed on the alignment layer. The pattern configuration comprises a plurality of first regions and a plurality of second regions, wherein the first regions are grating relief structure and interleaved with the second regions. A liquid crystal layer is coated on the alignment layer to cover the first regions and the second regions of the pattern configuration to a plane with a determined thickness on the surface of the first regions. The first phase retardation of the liquid crystal layer on the first regions and the second phase retardation of the liquid crystal layer on the second regions are different by 180°. The method for manufacturing the same is disclosed.

20 Claims, 5 Drawing Sheets

PATTERNED RETARDER FILM AND METHOD FOR MANUFACTURING THE SAME

This application claims the benefit of U.S. provisional application Ser. No. 61/348,768, filed on May 27, 2010, and U.S. provisional application Ser. No. 61/367,033, filed on Jul. 23, 2010, the subject matters of which are incorporated herein by reference.

BACKGROUND OF THE INVENTION

1. Field of the Invention

The invention relates in general to a patterned retarder film and a method for manufacturing the same, and more particularly to a patterned retarder film used in stereoscopic display systems and a method for manufacturing the same.

2. Description of the Related Art

In recent years, stereoscopic display systems with enhanced image quality have drawn more attention to the industry and become more popular to customers. It is known that applying a patterned retarder film to a liquid crystal display screen, a stereo imaging can thus be provided for audience wearing a pair of polarization glasses.

Some methods for manufacturing patterned retarder film are provided in the related art, such as a method of making a patterned retarder disclosed in U.S. Pat. No. 6,624,863 and a micro-retarder plate using a single plate with phase retardation disclosed in U.S. Pat. No. 6,498,679.

The present invention intends to provide a patterned retarder film with a novel structure and a method for manufacturing the same and more particularly to a patterned retarder film used in stereoscopic display systems and a method for manufacturing the same with an embossing treatment.

SUMMARY OF THE INVENTION

The present invention is directed to a patterned retarder film for a stereographic display system and a method for manufacturing the same. According to an aspect of the present invention, a patterned retarder film is provided. The present patterned retarder film comprises a substrate, a pattern configuration of a curable resin embossed on the first substrate, an alignment layer formed on the pattern configuration, and a liquid crystal layer coated on the alignment layer with a determined thickness. The pattern configuration on the substrate is formed by embossing a curable resin with a predetermined pattern comprising a plurality of first regions and a plurality of second regions, wherein the structure of the first regions and the second regions is grating-like stripe structure and parallel to each other and the structure of the first regions relative to that of the second regions is relief structure and interleaved with each other. The liquid crystal layer is coated on the alignment layer to cover the first regions and the second regions of the pattern configuration to a plane with a determined thickness on the surface of the first regions. The first phase retardation of the liquid crystal layer on the first regions and the second phase retardation of the liquid crystal layer on the second regions are different by 180°.

According to another aspect of the present invention, a method for manufacturing a patterned retarder film is provided. A method for manufacturing a patterned retarder film comprises the steps of providing a substrate; coating a curable resin on the first substrate; embossing the curable resin with a predetermined pattern to form a pattern configuration comprising a plurality of first regions and a plurality of second regions, wherein the structure of the first regions and the second regions is grating-like stripe structure and parallel to each other and the structure of the first regions relative to that of the second regions is relief structure and interleaved with each other; curing the pattern configuration; forming an alignment layer on the pattern configuration; coating a liquid crystal layer on the alignment layer to cover the first regions and the second regions of the pattern configuration to a plane with a determined thickness on the surface of the first regions; aligning the liquid crystal layer with the alignment layer; and curing the liquid crystal layer; wherein the first phase retardation of the liquid crystal layer on the first regions and the second phase retardation of the liquid crystal layer on the second regions are different by 180°.

In another aspect of the patterned retarder film of present invention, the present patterned retarder film is adhered to at least one functional optical film such as, for example, polarizing film, hard-coating film, low reflective film, anti-reflective film and anti-glaring film.

In further another aspect of the patterned retarder film of the present invention, the patterned retarder film is adhered to a display panel to provide a stereo image to the viewers.

The above and other aspects of the invention will become better understood with regard to the following detailed description of the preferred but non-limiting embodiment(s). The following description is made with reference to the accompanying drawings.

DETAILED DESCRIPTION OF THE INVENTION

Please note the drawings shown in the Figures are for illustrative purposes only and not to scale.

Figure 1:
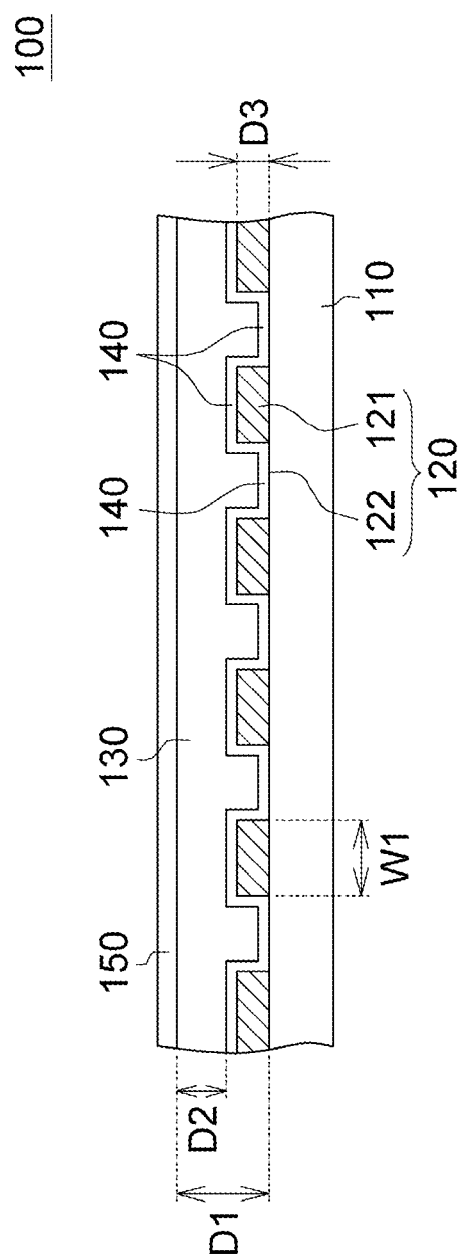
FIG. 1 is a cross-sectional view of a patterned retarder film of a preferred embodiment of the present invention.

A patterned retarder film 100 of a preferred embodiment of the present invention is shown in FIG. 1. The patterned retarder film 100 comprises a substrate 110, a pattern configuration 120 embossed with a curable resin formed on the substrate 110, an alignment layer 140 formed on the surface of the pattern configuration 120, and a liquid crystal layer 130 coated on the alignment layer 140 with a determined thickness. The pattern configuration 120 comprises a plurality of first regions 121 and a plurality of second regions 122 on the substrate 110, wherein the structure of the first regions 121 and that of the second regions 122 is grating-like stripe structure and parallel to each other and the structure of the first regions 121 relative to that of the second regions 122 is relief structure and interleaved with each other. The liquid crystal layer 130 is coated on the alignment layer 140, which fills the second regions 122 and fully covers the top surface of the first regions 121 with a determined thickness D2 on the surface of the first regions 121. The thickness of the liquid crystal layer 130 is determined in order to enable the first phase retardation of the liquid crystal layer 130 on the first regions 121 and the second phase retardation of the liquid crystal layer 130 on the second regions 122 to be different by 180°.

The phase retardation of the substrate 110 is less than 90° and preferably is substantial 0°. The substrate 110 can be a film of a poly(ethylene terephthalate) (PET), polycarbonate (PC), triacetyl cellulose (TAC), poly(methyl methacrylate) (PMMA) or cyclo-olefin polymer (COP). The thickness of the substrate 110 is in the range of 30 microns to 300 microns.

The pattern configuration 120 is formed by embossing a curable resin. The curable resin is selected from the group consisting of a UV curable resin and a thermo-curable resin. The curable resin can be a resin of acrylic resin, silicone and polyurethane. The pattern configuration 120 is embossed to form a plurality of first regions 121 and a plurality of second regions 122, wherein the structure of the first regions 121 and the second regions 122 is grating-like stripe structure and parallel to each other and the structure of the first regions 121 relative to that of the second regions 122 is relief structure. The phase retardation of the curable resin is substantial 0°.

The dimensions of the first regions 121 and second regions 122 of the pattern configuration 120 is determined by the polymerizable liquid crystal material used for the liquid crystal layer 130 and the pixel size, the resolution and viewing distance of a display system which the present patterned retarder film is adhered to. The difference between the first phase retardation of the first regions 121 and the second phase retardation of the second regions 122 results from the difference between the different thickness of the liquid crystal layer 130 on the first regions 121 and second regions 122 respectively. The thickness of the liquid crystal layer 130 on the first regions 121 is D1 and the thickness of the liquid crystal layer 130 on the second regions 122 is D2 as shown in FIG. 1. The difference of the thickness of the liquid crystal layer 130 on the first and the second regions 121, 122 depends on the highness D3 of the first regions 121. Therefore, the highness D3 of the first regions 121 is determined by that a phase retardation as, for example, ½λ (wavelength unit) is provided at such a thickness of a liquid crystal layer 130. In addition, the phase retardation of a liquid crystal layer 130 depends on the properties of the polymerizable liquid crystal materials used, such as the phase retardation thereof provided, and the thickness thereof, which are well known to any artisan skilled in the art. In the present invention, the highness D3 of the relief structure of the first regions 121 is in the range of 0.1 to 9.9 microns (μm). The width W1 of the relief structure of the first regions 121 is determined by the pixel size and the resolution of the display which the present patterned retarder film is adhered to, and viewing distance thereof. The width W1 of the relief structure of the first regions 121 and the pitch between every two first regions 121 are in the range of 10 to 900 microns (μm). Typically, the pitch between every two relief structure of the first regions 121 is selected from a range between 10 microns to 900 microns. For example, for a 24-inch LC display monitor, the width W1 of the relief structure of the first regions 121 and the pitch between two first regions 121 are about 250 microns. In the embodiment of the present invention that a substrate with low phase retardation is used, the highness D3 of the relief structure of the pattern configuration 120 and the thickness of the liquid crystal layer 130 can be selected in order to enable the first phase retardation of the liquid crystal layer 130 on the first regions 121 and the second phase retardation of the liquid crystal layer 130 on the second regions 122 to be different by 180°.

The alignment layer 140 is formed on the pattern configuration 120 by a process selected from the group consisting of micro-scratch alignment treatment, rubbing treatment, photo-alignment, SiO$_2$ evaporation, and ion beam alignment.

The liquid crystal material for the liquid crystal layer 130 used in the present invention is a polymerizable liquid crystal, such as, for example BASF LC242 (photopolymerizable liquid crystal diacrylate, available from BASF Co., Germany) and RMS10-021(UV curable reactive mesogen solution, available from Merck Display Tech Ltd, Taiwan.). As mentioned above, the thickness of the liquid crystal layer 130 determines the difference of the first phase retardation and the second phase retardation. In a preferred embodiment, the thickness D2 of the liquid crystal layer 130 on the first region 121 is about 0.5 microns to 2 microns. The thickness D1 of the liquid crystal layer 130 on the second region 122 is about 1.5 microns to 6 microns. In one embodiment of the patterned retarder film of the present invention, the liquid crystal material was BASF LC242 (photopolymerizable liquid crystal diacrylate, available from BASF Co., Germany), wherein the thickness of the liquid crystal layer 130 on the first region 121 is about 0.89 microns and the thickness of the liquid crystal layer 130 on the second region 122 is about 2.67 microns. In another embodiment of the patterned retarder film of the present invention, the liquid crystal material is RMS10-021 (UV curable reactive mesogen solution, available from Merck Display Tech Ltd, Taiwan), wherein the thickness D2 of the liquid crystal layer 130 on the first regions 121 is about 1.05 microns and the thickness D1 of the liquid crystal layer 130 on the second regions 122 is about 3.05 microns.

In an embodiment of the present patterned retarder film 100, a release film 150 is adhered to the liquid crystal layer 130, which can be removed before a functional optical film, such as a polarizer film, is adhered on the liquid crystal layer 130. In a further preferred embodiment of the patterned retarder film of the present invention, the present patterned retarder film 100 is able to be adhered to at least one functional optical film such as, for example, polarizing film, hard-coating film, low reflective film, anti-reflective film and anti-glaring film or to a display panel directly.

Figure 2:
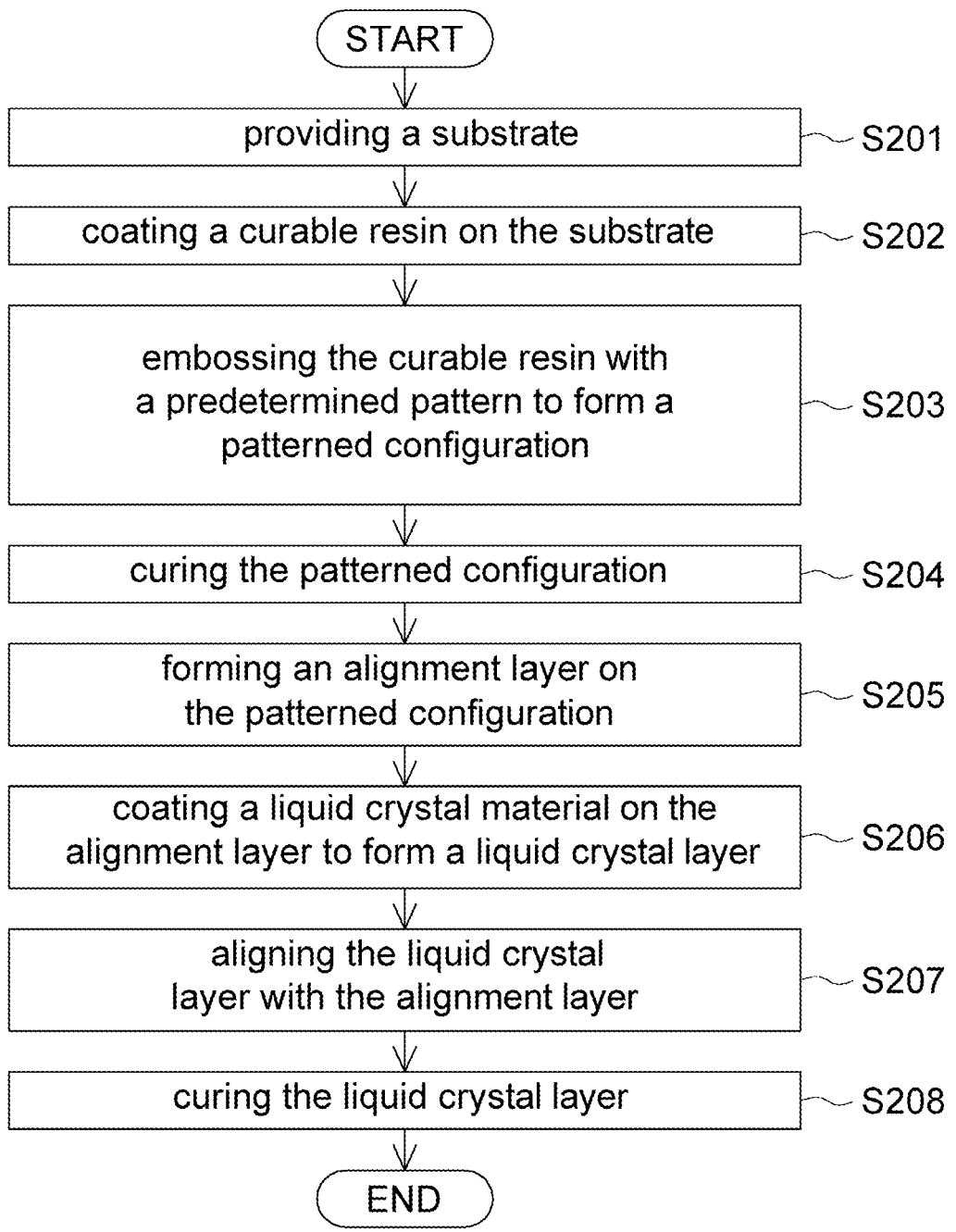
FIG. 2 shows a flow chart of a method for manufacturing the patterned retarder film of a preferred embodiment of the present invention.

A preferred embodiment of the method for manufacturing the patterned retarder film 100 of the present invention is illustrated by FIG. 2 together with FIGS. 3A to 3D. FIG. 2 is a flow chart of a method for manufacturing a patterned retarder film of an embodiment of the present invention. FIGS. 3A to 3D illustrate the steps in a method for manufacturing a patterned retarder film of an embodiment of the present invention.

Figure 3A:
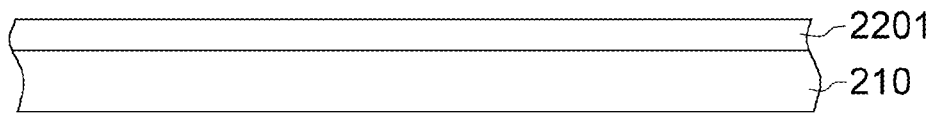
FIGS. 3A to 3D illustrate the steps in a method for manufacturing a patterned retarder film of an embodiment of the present invention.

In step S201, a substrate 210 is provided, as shown in FIG. 3A. The substrate 210 can be a poly(ethylene terephthalate) (PET), polycarbonate (PC), triacetyl cellulose (TAC), poly (methyl methacrylate) (PMMA) or cyclo-olefin polymer (COP). The thickness of the substrate 210 is in the range of 30 microns to 300 microns.

In the step S202, as shown in FIG. 3A, a curable resin 2201 is coated on the substrate 210. In the present embodiment, the phase retardation of the curable resin 2201 is substantially zero. The curable resin 2201 is a UV curable resin or a thermo-curable resin as the mentioned above.

Figure 3B:
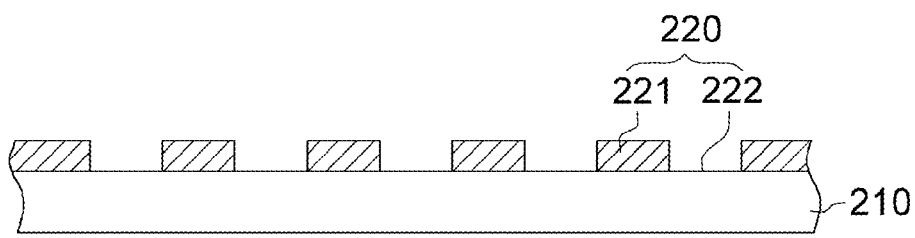

After the curable resin 2201 is coated on the substrate 210, the curable resin 2201 is conducted an embossing treatment as step S203. As shown in FIG. 3B, the curable resin 2201 is embossed to form a plurality of first regions 221 and a plurality of second regions 222. The highness and width of the relief structure of the first regions 221 and the width between every two adjacent relief structure of the first regions 221 are as above mentioned.

Figure 4:
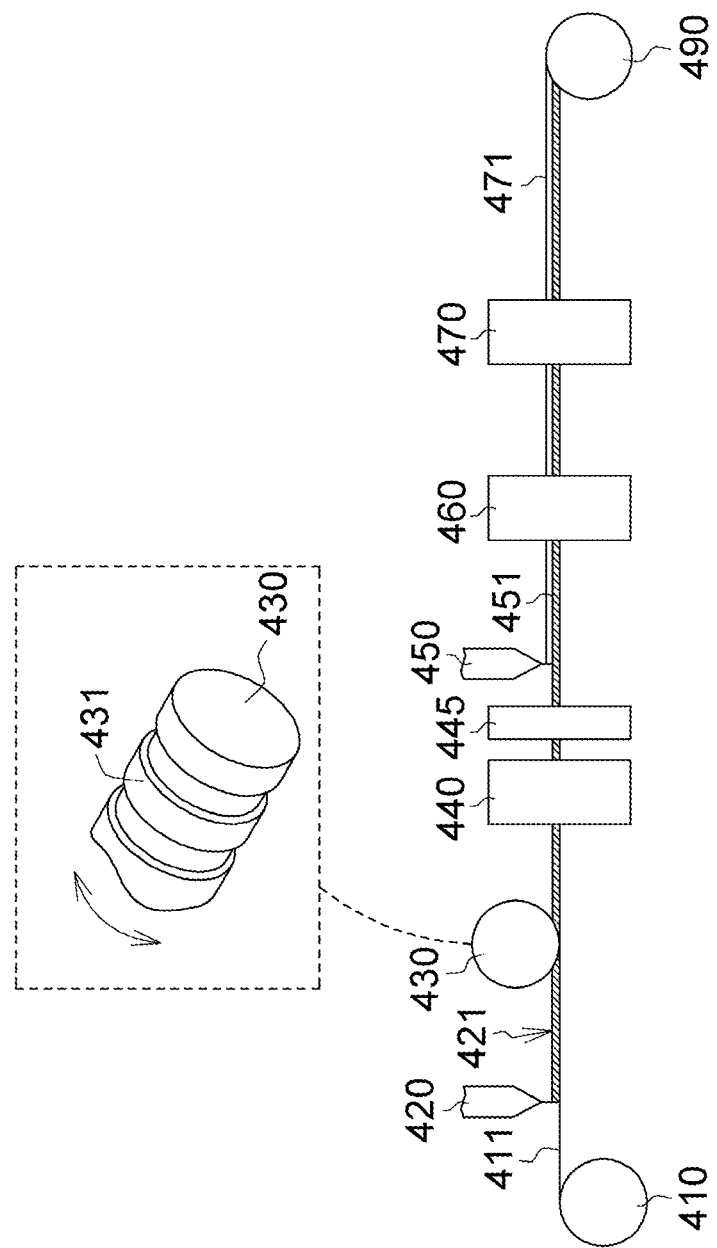
FIG. 4 is a diagrammatic view of a system used for manufacturing a patterned retarder film of an embodiment of the present invention.

The embossing treatment of the step S203 is effected by a stamp or a roller having a predetermined pattern on the surface thereof. In an embodiment of the method of the present invention, the embossing treatment is effected by such as a grooved roller 430 as shown in FIG. 4. The surface of the roller 430 is molded with a set of relief structures 431 which are grating-like stripe structure and parallel to each other. The set of relief structures 431 is extended along the rotating direction of the roller 430. In another embodiment of the method of the present invention, the set of the relief structures 431 is arranged in a direction perpendicular to the rotating direction of the roller 430 (not shown in Drawings).

In the step S204, the pattern configuration 220, as shown in FIG. 3B, is cured. In an embodiment of the method of the present invention, the curable resin is a UV curable resin and cured by UV radiation. In another embodiment of the method of the present invention, the curable resin is a thermo-curable resin and cured by heating treatment.

Figure 3C:
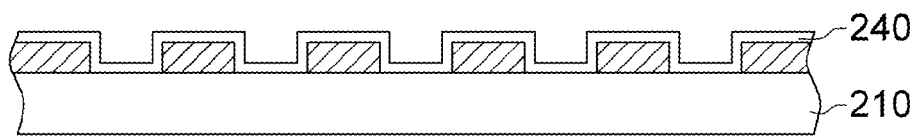

As shown in FIG. 3C, in the step S205, the alignment layer 240 is formed on surface of the pattern configuration 220. The alignment layer 240 is formed, for example, by micro-scratch alignment treatment, rubbing treatment, photo-alignment, $SiO_2$ evaporation, or ion beam alignment.

Figure 3D:
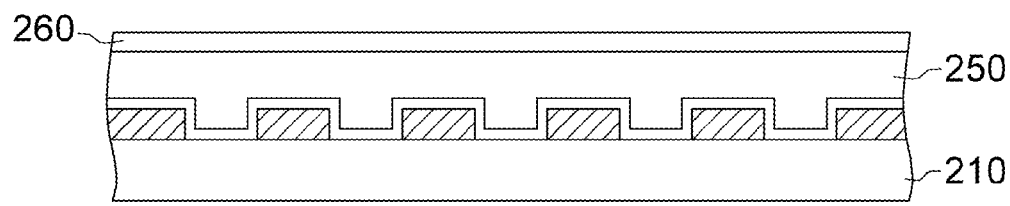

Referring to FIG. 3D, in the step S206, a liquid crystal layer 250 is coated on the alignment layer 240 with a determined thickness. In the present embodiment, the liquid crystal material for liquid crystal layer 250 of the present invention is a polymerizable liquid crystal, such as, for example BASF LC242 (photopolymerizable liquid crystal diacrylate, available from BASF Co., Germany) and RMS10-021(UV curable reactive mesogen solution, available from Merck Display Tech Ltd, Taiwan.). The liquid crystal was mixed in a solvent for conveniently coating on the alignment layer 240. The solid content of the liquid crystal solution is in the range from 10% to 50%. In a preferred embodiment of the method of the present invention, the solid content of the liquid crystal solution in the solvent is about 20%. The solvent used in the method of the present invention is known to an artisan skilled in the relevant art, such as, for example, propylene glycol monomethyl ether acetate (PGMEA).

In step S207 of FIG. 2, the coated liquid crystal layer 250 is conducted a heating treatment to remove the solvent and simultaneously align the liquid crystal with the alignment layer 240. The temperature of the heating treatment depends on the properties of the polymerizable liquid crystal materials. The heating treatment is conducted at a temperature in the range between about 20° C. to about 100° C., preferably from about 50° C. to about 100° C. In a preferred embodiment of the method of the present invention, the temperature of the heat treatment is at about 70° C. The temperature of the heating treatment was controlled in order to effect the alignment of the liquid crystal layer 250 to the alignment layer 240. After heating treatment, the thickness of the liquid crystal layer 250 on the first regions 221 is about 0.5 microns to 2 microns and that on the second regions 222 is about 1.5 microns to 6 microns. In one embodiment of the method of the present invention, the liquid crystal material was BASF LC242 (photopolymerizable liquid crystal diacrylate, available from BASF Co., Germany), wherein after heating treatment, the thickness of the liquid crystal layer 250 on the first regions 221 is about 0.89 microns and the thickness of the liquid crystal layer 250 on the second regions 222 is about 2.67 microns. In another embodiment of the patterned retarder film of the present, the liquid crystal material is RMS10-021 (UV curable reactive mesogen solution, available from Merck Display Tech Ltd, Taiwan), wherein the thickness of the liquid crystal layer 250 on the first regions 221 is about 1.05 microns and the thickness of the liquid crystal layer 250 on the second regions 222 is about 2.1 microns.

Next, in the step S208, the liquid crystal layer 250 is cured by UV radiation. In another embodiment, the liquid crystal layer 250 is cured by heating treatment. After the liquid crystal layer 250 is cured, the patterned retarder film can be adhered to a display panel directly or to an optical film such as polarizing film. Alternatively, the patterned retarder film was further adhered to a second film. In one embodiment of the present invention, the second film is a release film 260 which can be removed when the present patterned retarder film is adhered to a display panel or to an optical film such as polarizing film. In another preferred embodiment of the method of the present invention, the second film is a polarizing film directed adhered on the patterned liquid crystal layer 250. The present patterned retarder film also can be adhered with at least one of functional optical films selected from a group consisting of hard-coating film, low reflective film, anti-reflective film and anti-glaring film on the surface of the base film opposed to the surface for forming the alignment layer 240 in order to provide desired additional optical functionalities.

Figure 5:
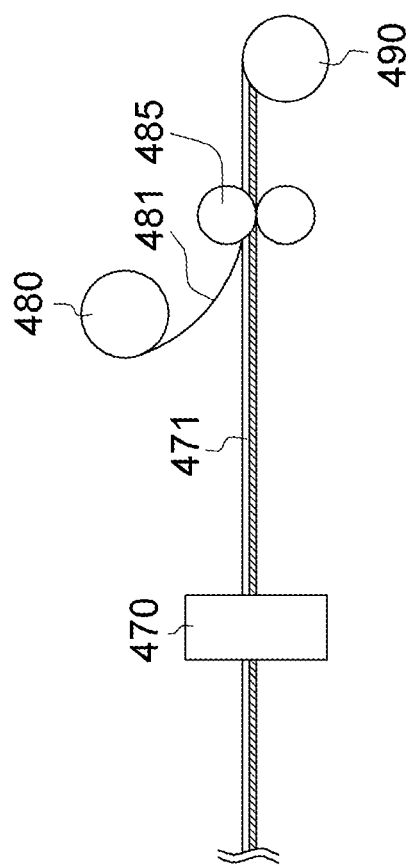
FIG. 5 is a diagrammatic view of a system used for manufacturing a patterned retarder film of another embodiment of the present invention.

The present method for manufacturing a patterned retarder film can be conducted in a batch production or a continuous production. FIG. 4 is a diagrammatic view of a system used for manufacturing a patterned retarder film of an embodiment of the present invention in a continuous production, such as, for example, a roll-to-roll system 400. The system 400 is for manufacturing the present patterned retarder film. The substrate 411 is unwound from a first roller 410 and conveyed to pass through a coating means 420 to coat a curable resin 421 thereon. The curable resin 421 is embossed by a roller 430 to form a pattern configuration and then cured via curable means 440, such as a UV radiation means. The cured resin 421 is conducted an alignment treatment to form an alignment layer thereon via an alignment device 445, such as a rubbing treatment device. A liquid crystal coating 451 is coated on the alignment layer via a liquid crystal coating means 450. The liquid crystal coating 451 is heated at a temperature in a range of about 20° C. to about 100° C., preferably in a range of about 50° C. to about 100° C. and more preferably at about 70° C., under a heating means 460 to remove the solvent contained in the liquid crystal coating 451 and simultaneously align the said liquid crystal coating 451 to the alignment layer. The aligned liquid crystal layer 451 is subsequently cured via a curing means 470, such as a UV-curing means or a thermo-curing means. After curing treatment, a patterned retarder film 471 is sequentially wounded on a second roller 490. In another embodiment of the method for manufacturing a patterned retarder film of the present invention, the patterned retarder film 471 can be laminated with a release film 481 which is rewound from a third roller 480. The release film 481 is in a direction to dispose on the patterned retarder film 471. The release film 481 and the patterned retarder film 471 are passed through a laminating means 485 and sequentially wound on a roller 490, as shown in FIG. 5. The film wound on the third roller 480 can be an optical film selected from the group consisting of polarizing film, hard-coating film, low reflective film, anti-reflective film and anti-glaring film.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A patterned retarder film, comprising:
   a substrate;
   a pattern configuration on the substrate formed by embossing a curable resin with a predetermined pattern, comprising a plurality of first regions and a plurality of second regions, wherein the structure of the first regions and the second regions is grating-like stripe structure, the first regions and the second regions are parallel and interleaved with each other, and the structure of the first regions is relief structures;
   an alignment layer formed on the pattern configuration; and
   a liquid crystal layer coated on the alignment layer to cover the first regions and the second regions of the pattern configuration to a plane with a determined thickness on the surface of the first regions;
   wherein the first phase retardation of the liquid crystal layer on the first regions and the second phase retardation of the liquid crystal layer on the second regions are different by 180°.

2. The patterned retarder film according to claim 1, wherein the thickness of the substrate is in the range of 30-300 microns (μm).

3. The patterned retarder film according to claim 1, wherein the substrate is selected from the group consisting of poly(ethylene terephthalate), polycarbonate, triacetate cellulose, poly(methyl methacrylate), and cyclo-olefin polymer.

4. The patterned retarder film according to claim 1, wherein the phase retardation of the substrate is less than 90°.

5. The patterned retarder film according to claim 4, wherein the phase retardation of the substrate is substantially zero.

6. The patterned retarder film according to claim 1, wherein the pattern configuration is a curable resin selected from the group consisting of acrylic resin, silicone and polyurethane.

7. The patterned retarder film according to claim 1, wherein the highness of the relief structure of the first regions is in the range of 0.1 to 9.9 microns (μm).

8. The patterned retarder film according to claim 1, wherein the highness of the relief structure of the first regions is in the range of 1 to 4 microns (μm).

9. The patterned retarder film according to claim 1, wherein the width of the relief structure of the first regions is in the range of 10 to 900 microns (μm).

10. The patterned retarder film according to claim 1, wherein the patterned retarder film is further adhered to at least one of functional optical films selected from a group consisting of polarizing film, hard-coating film, low reflective film, anti-reflective film and anti-glaring film.

11. A method for manufacturing a patterned retarder film, comprising the steps:
    providing a substrate;
    coating a curable resin on the first substrate;
    embossing the curable resin with a predetermined pattern to form a pattern configuration comprising a plurality of first regions and a plurality of second regions, wherein the structure of the first regions and the second regions is grating-like stripe structure, the first regions and the second regions are parallel and interleaved with each other, and the structure of the first regions is relief structure;
    curing the pattern configuration;
    forming an alignment layer on the pattern configuration;
    coating a liquid crystal layer on the alignment layer to cover the first regions and the second regions of the pattern configuration to a plane with a determined thickness;
    aligning the liquid crystal layer with the alignment layer; and
    curing the liquid crystal layer;
    wherein the first phase retardation of the liquid crystal layer on the first regions and the second phase retardation of the liquid crystal layer on the second regions are different by 180°.

12. The method according to claim 11, wherein the thickness of the substrate is in the range of 30 to 300 microns (μm).

13. The method according to claim 11, wherein the substrate is selected from the group consisting of polyethylene terephthalate, polycarbonate, triacetate cellulose, polymethylmethacrylate, and cyclo-olefin polymer.

14. The method according to claim 11, wherein the phase retardation of the substrate is less than 90°.

15. The method according to claim 11, wherein the phase retardation of the substrate is substantially zero.

16. The method according to claim 11, wherein the curable resin is selected from the group consisting of acrylic resin, silicone and polyurethane.

17. The method according to claim 11, wherein the pattern configuration is cured by a process selected from the group consisting of UV radiation and heating treatment.

18. The method according to claim 11, wherein in the step of forming an alignment layer on the pattern configuration, the alignment layer is formed by a process selected from the group consisting of micro-scratch alignment treatment, rubbing treatment, photo-alignment, SiO2 evaporation, and ion beam alignment.

19. The method according to claim 11, wherein the step of aligning the liquid crystal layer with the alignment layer is conducted by heating treatment.

20. The method according to claim 11, wherein the step of curing the liquid crystal layer is conducted by a curing process selected from the group consisting of UV radiation and heating treatment.

* * * * *